350-374 SR

OR 3,781,086

X4022C
X4023H

United States Patent [11] 3,781,086

Kumada et al. [45] Dec. 25, 1973

[54] DOMAIN SWITCHING ELEMENT AND METHOD OF PRODUCING THE SAME

[75] Inventors: Akio Kumada; Yoshihiro Onishi, both of Kokubunji; Hirohumi Ogawa, Hichioji; Sakichi Ashida, Fuchu; Saburo Nonogaki, Tokyo, all of Japan

[73] Assignee: Hitachi, Ltd., Tokyo, Japan

[22] Filed: June 27, 1972

[21] Appl. No.: 266,658

[30] Foreign Application Priority Data

| | | |
|---|---|---|
| June 30, 1971 | Japan | 46-47217 |
| June 30, 1971 | Japan | 46-48330 |
| Sept. 18, 1971 | Japan | 46-72679 |
| Sept. 18, 1971 | Japan | 46-72680 |
| July 28, 1971 | Japan | 46-56539 |

[52] U.S. Cl. .................. 350/150, 350/151, 350/160
[51] Int. Cl. .................. G02f 1/26
[58] Field of Search .................. 350/150, 151, 160, 350/161

[56] References Cited

UNITED STATES PATENTS 3,437,432 4/1969 Borchardt .......................... 350/150

*Primary Examiner*—David Schonberg
*Assistant Examiner*—Michael J. Tokar
*Attorney*—Paul M. Craig, Jr. et al.

[57] ABSTRACT

A domain switching element using a plate of an irregular ferroelectric crystal cut perpendicularly to the ferroelectric axis of the crystal and having nucleus domains of multiple domain structure provided on both the sides of the switching region of the element in the direction <110> of the crystal, the nucleus domains extending along the direction <110>. The area of single domain having a predetermined polarity can be arbitrarily controlled in response to the polarity of the threshold voltage applied to the switching region.

4 Claims, 34 Drawing Figures

PATENTED DEC 25 1973

3,781,086

SHEET 06 OF 12

DOMAIN SWITCHING ELEMENT AND METHOD OF PRODUCING THE SAME

The present invention relates to a domain switching element in which an irregular ferroelectric substance is used, and to the method of producing such an element.

By the domain switching element is meant a device which can arbitrarily generate, grow, preserve or eliminate a positive or negative single domain.

And by the irregular ferroelectric substance is meant a ferroelectric material in which the lattice state is changed when the state of the spontaneous polarization is shifted from positive to negative and vice versa. Namely, when a ferroelectric material such as Potassium dihydrogen phosphate (hereinafter referred to as KDP), or Gadollinium molybdate (hereinafter referred to as GMO) is placed in a threshold electric field (or mechanical stress) which has a polarity different from that of the spontaneous polarization of the ferroelectric material, the spontaneous polarization is turned into the polarity of the applied field, and also the state of lattice in the ferroelectric material is changed. The variation of the polarity is explained with the aid of a model as follows. Let it be assumed that the crystal of the ferroelectric material has a shape of a rectangular parallelepiped with its edges having lengths $a$, $b$ and $c$ ($a<b$), the edges $a$, $b$ and $c$ being parallel to the crystallographic axes $a$, $b$ and $c$ of the material, respectively, and that the crystal has a spontaneous polarization in the direction parallel to the *c*-axis. If a threshold electric field (or mechanical stress) intenser than the coercive field (or stress) is applied to the crystal, the direction of the spontaneous polarization is inverted. This means that the lattice arrangement rotates through 90°) in space about the *c*-axis. Namely, this state of rotation is equal to the interchange between the *a*-axis and the *b*-axis. In this specification, such ferroelectrics as encounter the above described state of change under appropriate conditions are especially referred to as irregular ferroelectrics and distinguished from such ferroelectrics as triglycine sulfate and barium titanate in which due to the application of a threshold field (in this case stress has no effect) the polarity of the spontaneous polarization is shifted, but the lattice arrangement is not affected.

The table given below shows examples of such irregular ferroelectrics.

| Point group | Substance |
|---|---|
| mm2 | KDP, GMO, boracite, rock salt, molybdates of rare-earth elements. |
| 2-II | Ammonium-cadmium sulfate, methyl ammonium-aluminum sulfate·12 hydrate. |

In the table above, "mm2" indicates two mirror lines with respect to lattice point and a point-group symmetry 2 and "2-II" designate two point-groups symmetry 2.

The notable characteristic of the irregular ferroelectric material is a memory effect due to the shift of the spontaneous polarization. The state of the spontaneous polarization remains unaltered so long as no external force (threshold) is exerted on the crystal.

Further, the above mentioned irregular ferroelectrics are crystallo-optically biaxial birefringent. Accordingly, the reversal of the spontaneous polarization is equivalent to the rotation through 90° of the lattice arrangement about the *c*-axis (or the interchange between the *a*-axis and the *b*-axis) and, therefore, the cyrstallo-optical characteristic of the material varies with the variation in the spontaneous polarization.

Thus, in order to apply such irregular ferroelectric materials to optical means, the cyrstal thereof must be cut into a crystal plate having homogeneous optical property (single domain, for example) in which the crystallo-optical property may be arbitrarily controlled according to purposes by changing the polarity of the single domain.

This invention is described in detail with reference to the accompanying drawings, in which;

FIG. 1*a* is a front view of the *c*-cut plane of a square lattice in the paraelectric phase;

FIGS. 1*b* to 1*e* are front views of the square lattice as shown in FIG. 1, which are subjected to lattice deformation;

FIGS. 2*a* and 2*b* are front views of the *c*-cut planes of irregular ferroelectric crystals having multiple domain structures, in which the direction of extension of the multiple domain of the crystal shown in FIG. 2*a* is perpendicular to that of the crystal shown in FIG. 3*b;*

FIG. 2*c* is a front view of *c*-cut plane of an irregular forroelectric crystals in which there are multiple domains perpendicular to each other;

FIGS. 3and 3*b* are front views of *c*-cut planes of GMO single crystals in which nuclei (or nucleous domains) are created upon application of a dc voltage across the crystals;

FIG. 4*a* is a longitudinal cross section of a main part of one embodiment of a domain switching element having nuclei in the strain layer, FIGS. 4*b* and 4*c* being longitudinal cross sections of main parts of other embodiments of a domain switching element having nuclei in the strain layers;

Figure 8:
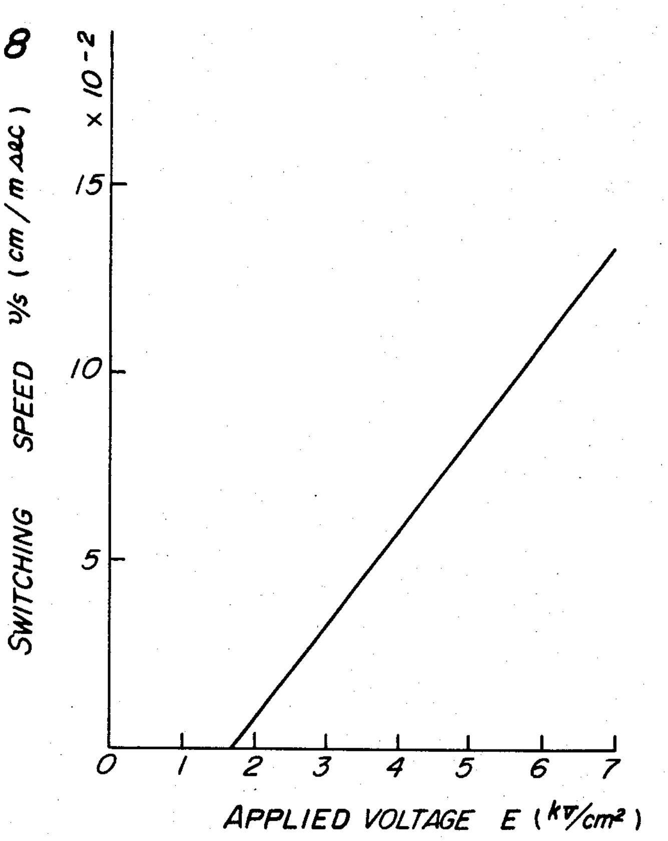
Figure 6A:
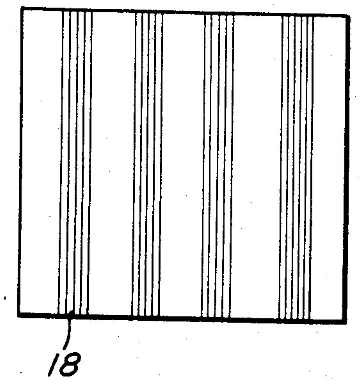
FIG. 6a is a front view of a *c*-cut plate of GMO crystal in which multiple domains are formed parallel to the <110> direction.
Figure 6B:
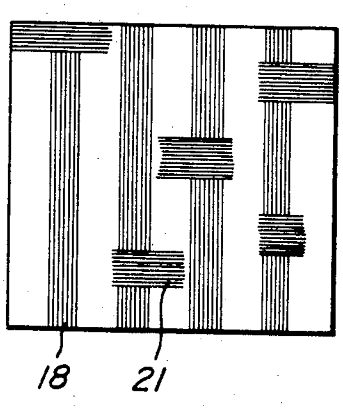
Figure 7:
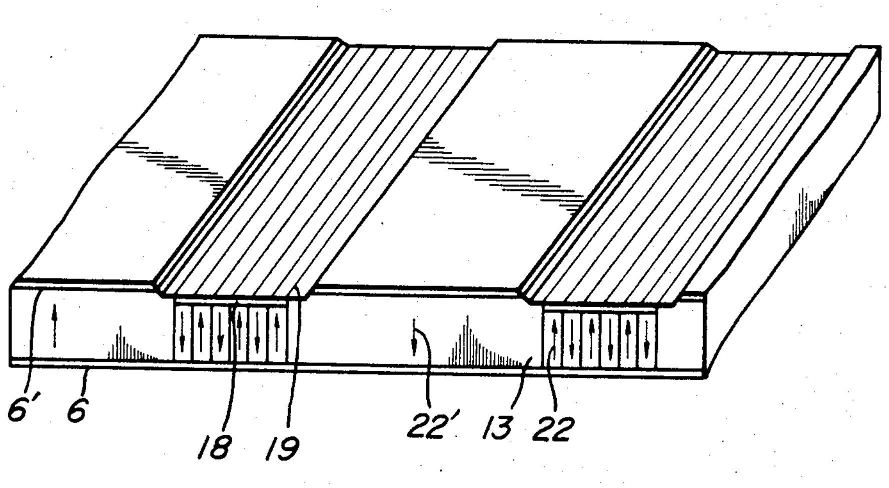
Figure 9A:
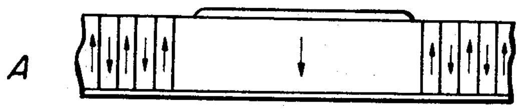
Figure 9B:
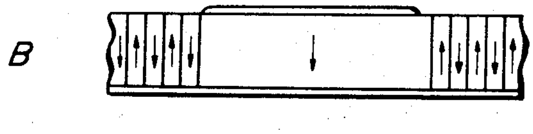
Figure 10A:
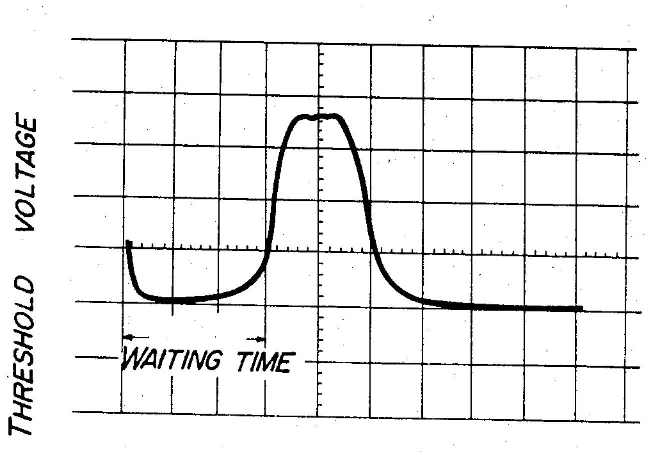
Figure 10B:
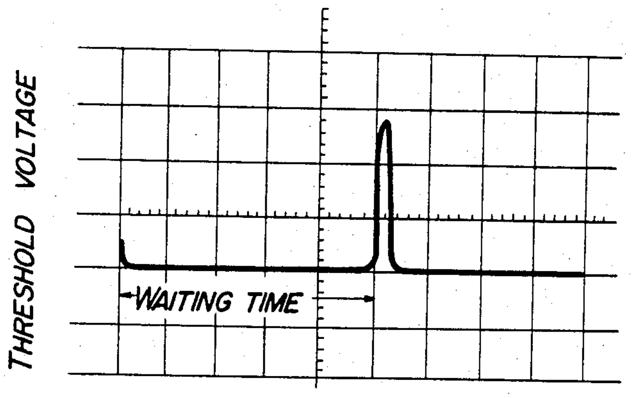
Figures 11, 12:
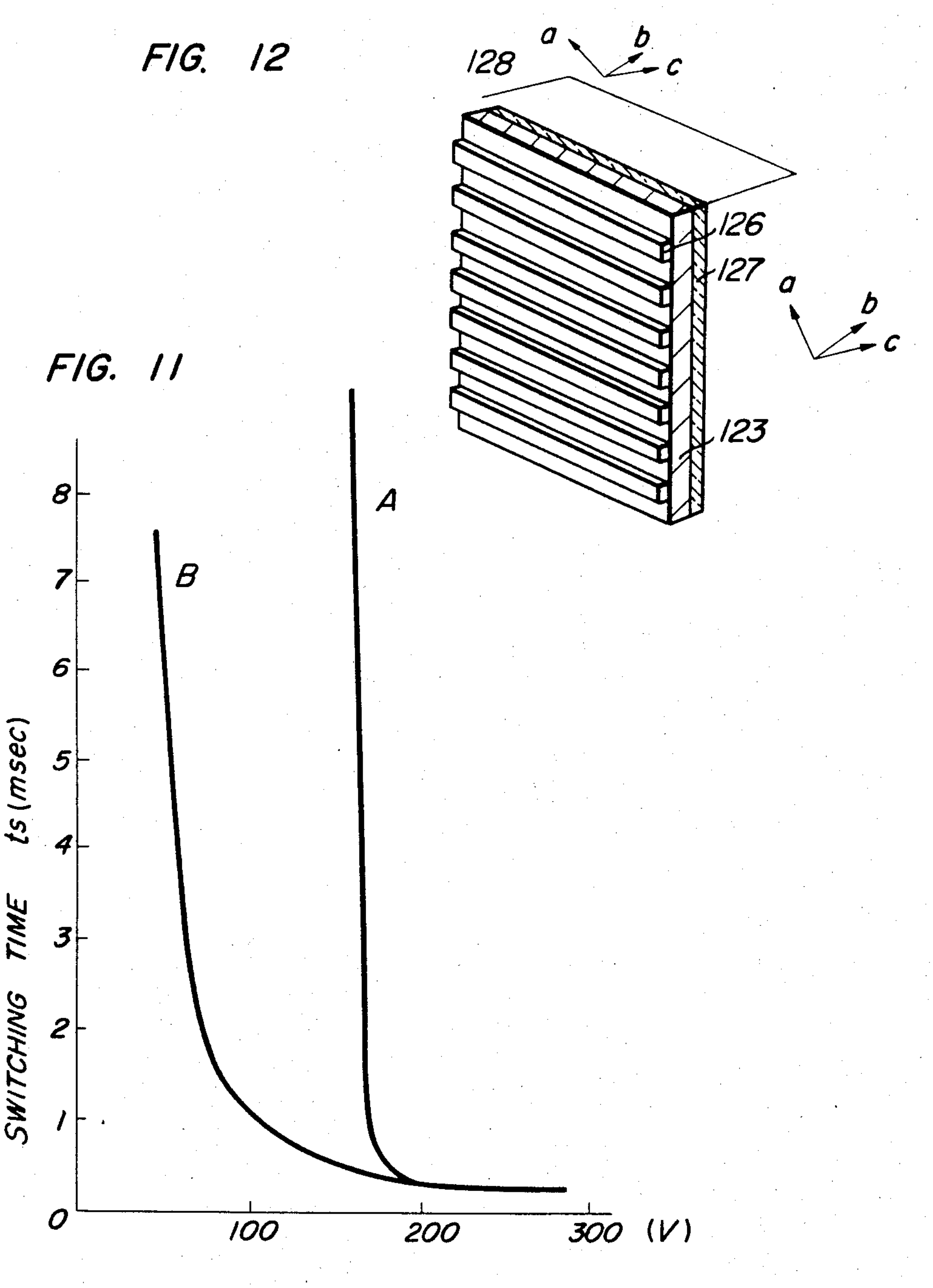
Figure 13:
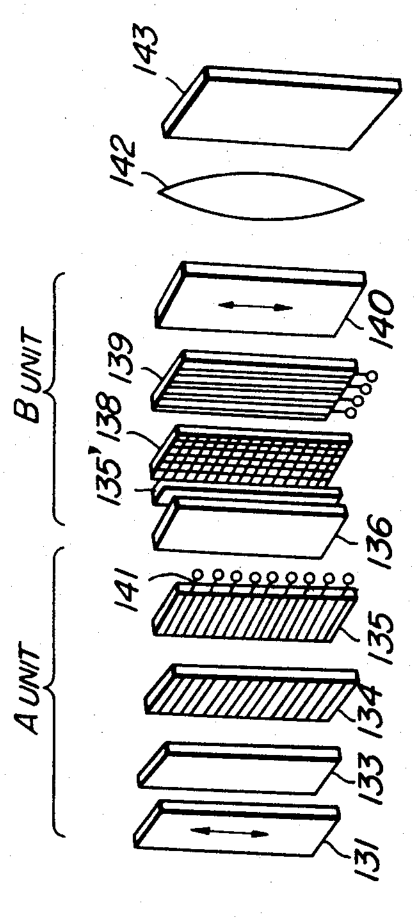
Figure 14:
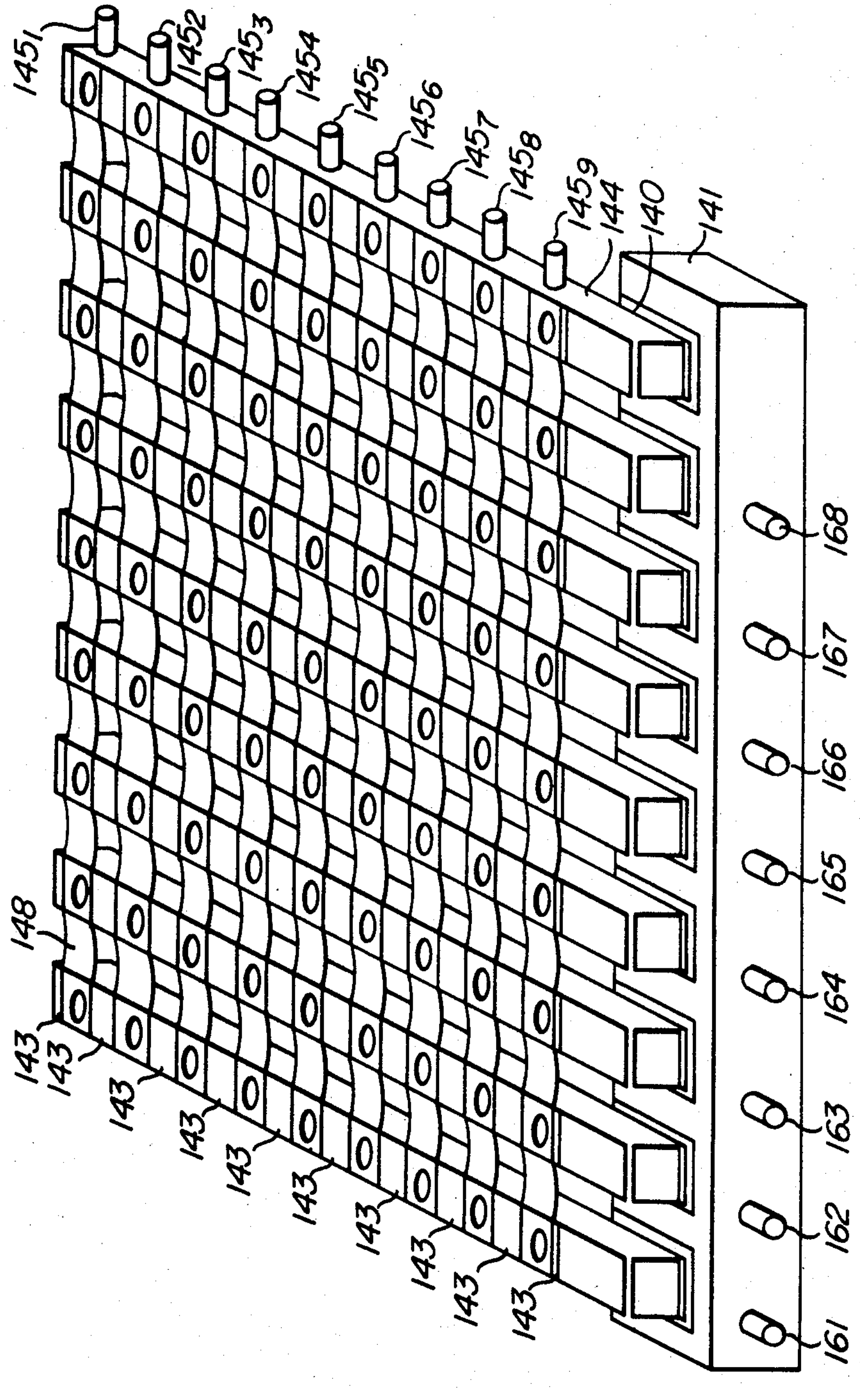
Figure 15:
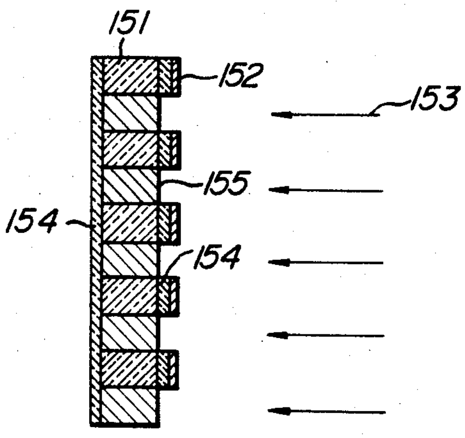
Figure 16:
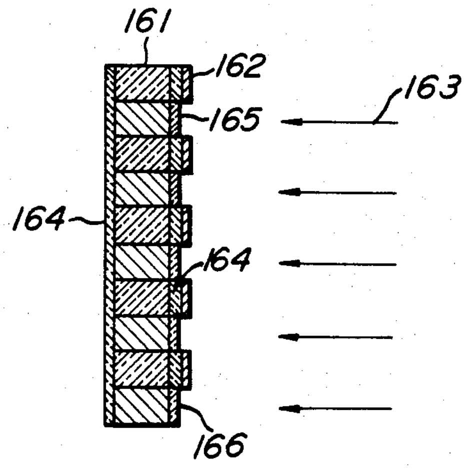
Figure 17:
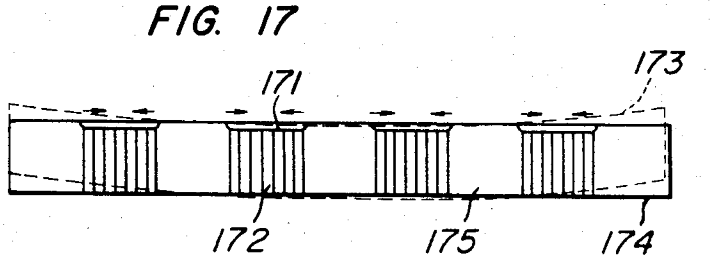
Figure 18:
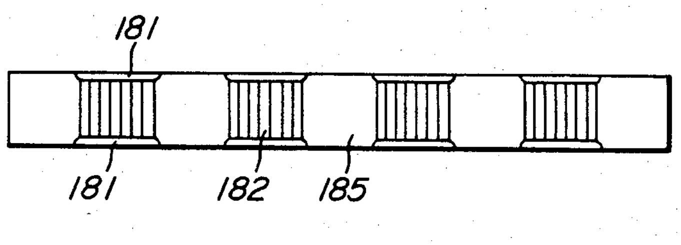
Figure 19:
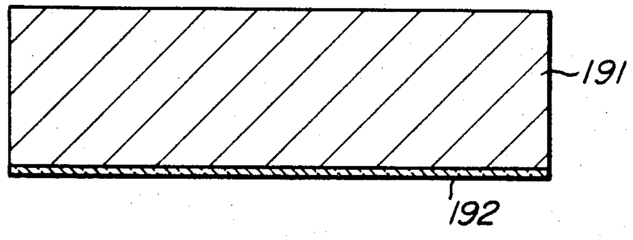
Figure 20:
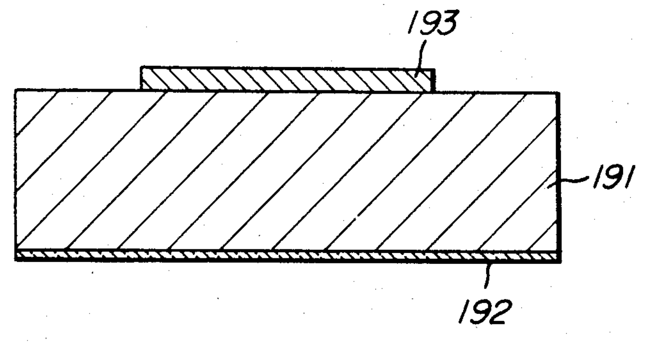
Figure 21:
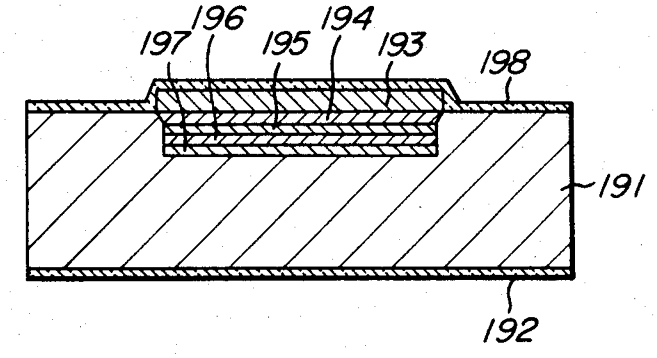
Figure 22:
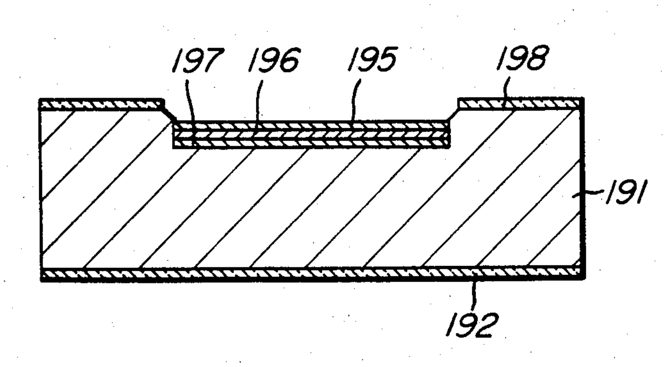

FIG. 6*b* shows the *c*-cut plate of FIG. 6*a* in which lateral nuclei or nucleous domains are formed;

FIG. 7 is a perspective views of a domain switching element;

FIG. 8 shows graphically the relation between the domain switching speed and the magnitude of the voltage applied along the *c*-axis of a quarter-wavelength GMO plate;

FIGS. 9*a* and 9*b* are longitudinal cross sections of the main parts of an A-type domain switching element and a B-type domain switching element, respectively;

FIGS. 10*a*, 10*b* and 11 comparatively show the threshold characteristics of the A- and B-type elements, both made of quarter-wavelength plate of *c*-cut GMO crystal;

FIG. 12 shows as an example an element for displaying row (or column) pattern, which is made of GMO crystal;

FIG. 13 shows as another example a similar element for displaying such a pattern;

FIG. 14 shows an improved element for displaying such a pattern;

FIG. 15 shows an example of carrying out the method of producing a domain switching element according to the present invention, which method utilizes radioactive irradiation;

FIG. 16 shows another example of carrying out the method of producing a domain switching element according to the invention, which also utilizes the radioactive irradiation;

FIGS. 17 and 18 are longitudinal cross sections useful for illustrating the difference between two kinds of domain switching elements provided with strain layers after completion, in FIGS. 17 being shown an element provided with a strain layer only on one side surface and in FIG. 18 being shown an element having its both side surfaces provided with strain layers;

FIG. 19 shows a *c*-cut GMO plate having one of its main surfaces entirely covered with Nesa film;

FIG. 20 shows a *c*-cut GMO plate having one of its main surfaces entirely covered with vapor deposited alkali-halide film and having Nesa film formed on the alkali-halide film;

FIG. 21 shows the internal structure of a *c*-cut GMO plate covered with a duplex layer of alkali-halide and Nesa films; and FIG. 22 shows the constitution of the strain layer of the *c*-cut GMO plate after the plate has been subjected to washing by water.

Figure 1A:
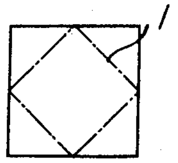
Figure 1B:
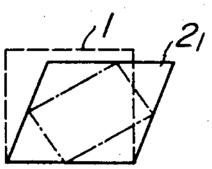
Figure 1C:
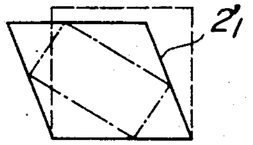
Figure 1D:
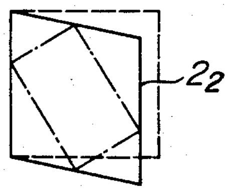
Figure 1E:
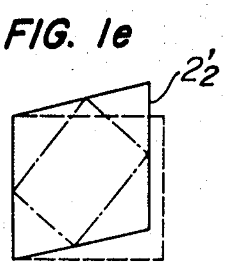
Figure 2A:
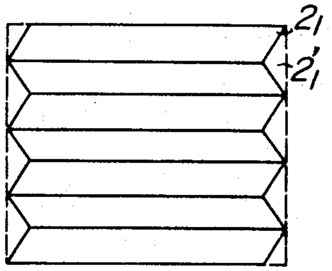
Figure 2B:
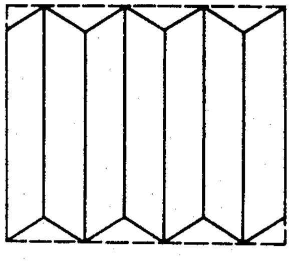
Figure 2C:
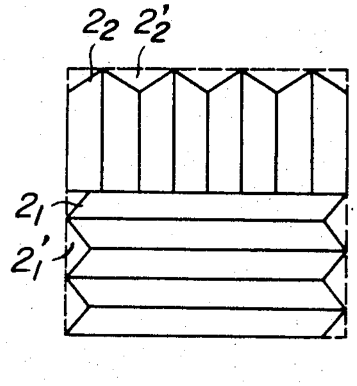
Figure 3A:
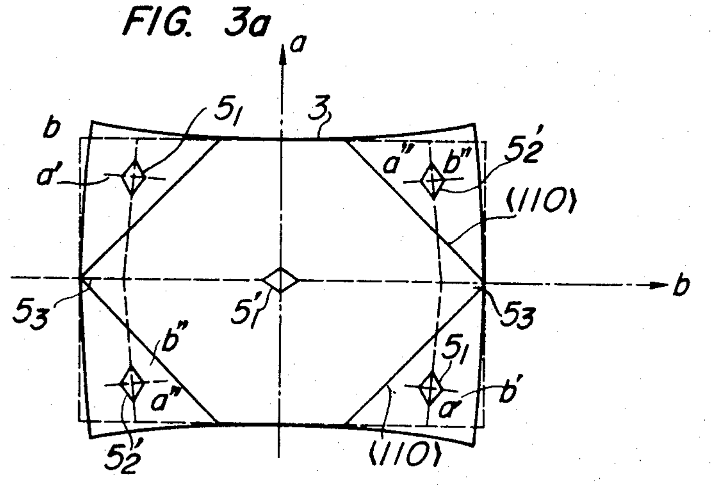
Figure 3B:
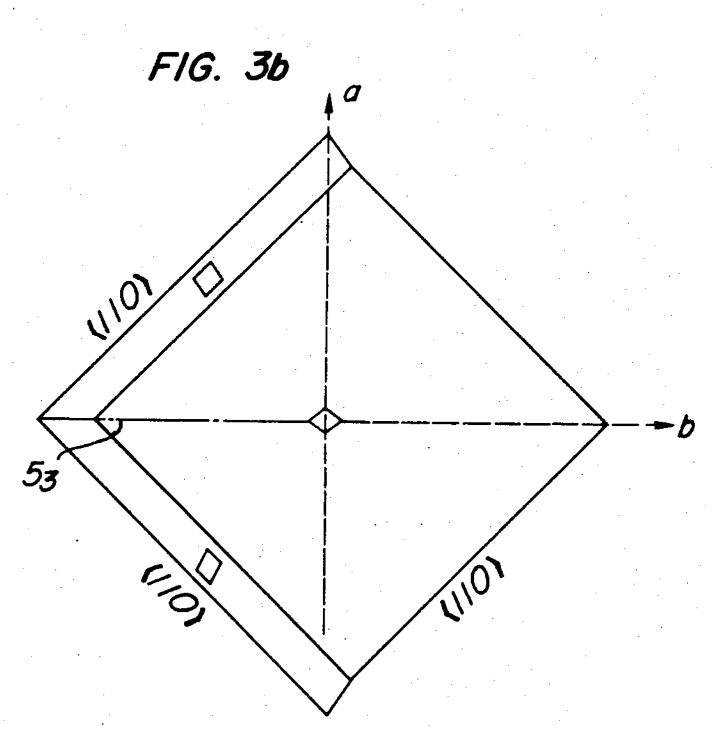

In an irregular ferroelectric material, the unit lattice of the crystal may be transformed into a pair of primitive lattices which can alternate between each other when the transition from paraelectric phase to ferroelectric one takes place. For example, GMO single crystal has square lattice in its paraelectric phase as shown in FIG. 1*a* (where the square lattice is cross-sectioned along a plane perpendicular to the *c*-axis, i.e. ferroelectric axis and where solid line shows a primitive cell of tetragonal system along its crystallgraphic axis while broken line shows a primitive cell of orthorhombic system) but the square lattice can be transformed into four lattices $2_1$, $2_1'$, $2_2$ and $2_2'$ shown respectively in FIGS. 1*b* to 1e in the ferroelectric phase. The polarization of each of the four primitive lattices can be inverted. These four lattices can be classified into one group comprising lattices $2_1$ and $2_1'$ and the other comprising lattices $2_2$ and $2_2'$, lattices in each group being able to alternate between each other upon reversal of polarization. In each group, one lattice arrangement can be transformed into the other when a voltage higher than the coercive field which voltage has a polarity opposite to the spontaneous polarization of the crystal in the one lattice arrangement, is applied to the crystal (the spontaneous polarization is inverted after the transformation). Moreover, such four kinds of primitive lattices, which are existing together in the crystal, grow up into single domain having one polarity, when an external field (or stress) is applied to the crystal. FIGS. 2*a* to 2*c* show the states of polarizations in the *c*-plane (perpendicular to the *c*-axis) of GMO single crystal and, as is seen in the figures, domains having opposite polarities are contiguous alternately to each other over domain walls. And if the magnitude of the applied external field increases, the domains whose polarization is opposite to the polarity of the applied field are gradually inverted and simultaneous with this polarization reversal lattice deformation takes place so that the domain walls move perpendicularly toward the opposite domains. When the external voltage is removed, the domain walls stop moving and remain there. Accordingly, the forward or reverse shift and the fixing of the domain walls can be controlled by controlling the application of the voltage (or stress).

It is noted here that there is a case where domains $2_1$, $2_1'$ and $2_2$, $2_2'$ whose domain wall grow perpendicularly to each other, as seen in FIG. 2*c*, are brought about when the domain wall is shifted under control by the external field. In this case, it often happens that the further growth of such domains causes the crystal to break since force is created along the border line between perpendicular domains. Therefore, in order to use such irregular ferroelectrics for the purpose in question, the crystal must be a single domain element free of such perpendicular domains.

In order to generate a single domain in GMO single crystal, it is only necessary to create in the crystal a nucleus (hereinafter referred to as a nucleus domain) of a domain having a predetermined polarity. The nucleus domain will then grow up in the direction normal to its domain wall. For example, if a dc voltage of about 100V is applied to a *c*-cut (001) GMO plate 10 mm long, 10 mm wide and 0.34 mm thick, then nucleus domains $5_1$, $5_2$ and $5_1'$, $5_2'$ are created near the domain $5_1'$ of the plate perpendicularly to the direction <110>. As the nucleus domains grow up, they exert forces on one another so that each domain is prevented from further growing. If a much higher voltage is applied to promote the further growth of such domains, the crystal plate tends to crack.

A domain switching element in which the reversal of the spontaneous polarization is facilitated by eliminating perpendicular nucleus domains from the irregular ferroelectric crystal and a method of producing the element are disclosed in the German Pat. No. 2,012,047. According to the publication, two nucleus domains each having a single polarity and a polarity of one domain being opposite to that of the other, are provided on both sides of the region of a *c*-cut irregular ferroelectric single crystal plate where means for controlling the spontaneous polarization is disposed.

However, the invention disclosed in the German Pat. No. 2,012,047 has the following drawbacks.

1. The polarities (negative or positive according to the direction of the spontaneous polarization) of the two nucleus domains on both the sides of the switching region (i.e., region within which the domain walls in the irregular ferroelectric crystal can reversibly be moved about) must be made opposite to each other. When it is desired to invert the polarity of a domain, a voltage or stress has only to be applied to the domain. However, since there is no electrode provided for the nucleus domains, it is very difficult to control the polarities of nucleus domains arbitrarily in case where the domain switching element is very small or where many such elements are fabricated.

2. By applying a voltage to the irregular ferroelectric crystal to make the polarity of the domain in the crystal the same as that of one of the nucleus domains, the domain walls between the switching region and the nucleus domains gradually move toward the domain having opposite polarity and at last stop on the border between the domain and the nucleus domains. This is because the quantity of electric charges Q (i.e., Q = 2 21 $W \cdot P_S dx$, where W is the length of the domain wall, $P_S$ the magnitude of spontaneous polarization of the irregular ferroelectric material, and $x$ the distance of displacement of the domain wall) to displace the domain wall can not be supplied since no electrodes are provided for the nucleus domain.

In this case, however, the domain wall does not lie exactly on the border between the switching region and the nucleus domains but tends to invade into the nucleus domains. This is because the parts of the surface of the crystal corresponding to the nucleus domains are rendered conductive due to the stray voltage caused by moisture or when a dc voltage continues to be applied for too long a time. If the intrusion of the domain wall into the nucleus domains takes place, switching by the application of a reverse voltage becomes so hard.

3. Further, there are caused difficulties in the process of removing the Nesa electrodes provided when the nucleus domains are formed on both the sides of the switching region. Namely, besides electrolysis in sodium chloride solution a method is proposed to remove Nesa electrode in which metal such as aluminum is vapor-deposited on the part to be removed, then Nesa electrode is coated on the aluminum layer, and finally the Nesa electrode together with the aluminum layer is erroded away in alkali solution. In both the cases, however, the part of the electrode tends to be damaged during the process of removing the Nesa electrode which part serves as an electrode for domain switching.

As described above, the device disclosed in the German Pat. No. 2,102,047 turns unstable when a dc voltage is continuously applied for a very long time or when there is much moisture. In addition the way of removing the Nesa electrode is not satisfactory. Of course, the switching element can be free, if not entirely, from stray voltage if the driving circuit is properly designed or if the electrodes of the element are short-circuited through a high resistance when no voltage is applied across the electrodes. And the element can be protected from moisture by the coating of anti-moisture agent. These artifices for stability, however, is against external influences and therefore these are not means to stabilize the nucleus domains themselves.

The present invention has been made in order to eliminate the above mentioned drawbacks contingent to conventional domain switching element made of irregular ferroelectric crystals.

Accordingly, it is an object of the present invention to provide an irregular ferroelectric domain switching element which is not affected by stray voltage.

Another object of the invention is to provide a method of producing an irregular ferroelectric domain switching element in which nucleus domains are easily to be generated.

The domain switching element according to the present invention comprising an irregular ferroelectric crystal plate having two opposite ferroelectric surfaces, the irregular ferroelectric crystal plate comprising

*a.* a first strain layer having multiple domain structure with its one end extending along the direction <110>,

*b.* a second strain layer isolated from the first layer and having multiple domain structure with its one end extending along the direction <110>and

*c.* a switching region inserted between and kept in contact with the end <110> of the first strain layer and the end <110> of the second strain layer. Switching opeation is performed by applying a voltage having a predetermined polarity to the element through electrodes provided on the ferroelectric surfaces of the switching region.

The strain layer of the domain switching element is either made of solid solution of sodium halide, potassium halide, or lithium halide and the irregular ferroelectric material constituting the element or formed by creating in the irregular ferroelectric crystal a great number of lattice defects by the irradiation of neutron rays. These strain layers serve as nucleus domains. In the domain switching element according to the present invention, the nucleus domains appear to be smaller than they really are when the parts of the nucleus domains close to the switching region have the polarity as the switching region. In reality, however, the strain layers should be regarded as the nucleus domains.

And in the formation of the strain layers for the irregular ferroelectric domain switching element, according to the invention, 1. solid films are deposited on the irregular ferroelectric single crystal plate in halide atmosphere at temperatures above the Curie point of the crystal (about 500° C), the film having a shape of stripes extending parallel to the edge <110>, and thereafter 2. the single crystal plate is cooled below the Curie point ($T_c$) so that multiple domain structure is formed in the solid films, and thus strain layers are formed on both the sides of the switching region which layers serve as nucleus domains in the multiple domain structure.

According to another way of forming strain layers in the opposite surfaces of the switching region of the irregular ferroelectric domain switching element, the parts of the switching region where the strain layers are to be formed are irradiated by radioactive rays so that the arrangement of atoms in the irradiated portions collapses and that due to the variation in volume caused in the irradiated portions are brought about strain layers which in turn give rise to multiple domain structure.

As described above, the merits obtainable by providing the nucleus domains of multiple domain structure in the irregular ferroelectric domain switching element, are as follows.

1. The intrusion of domain wall into the nucleus domain, which might eliminate the nucleus domain in the end, is prevented and the domain wall will never introde beyond a certain distance from the switching region into the nucleus domain.

Figure 5:
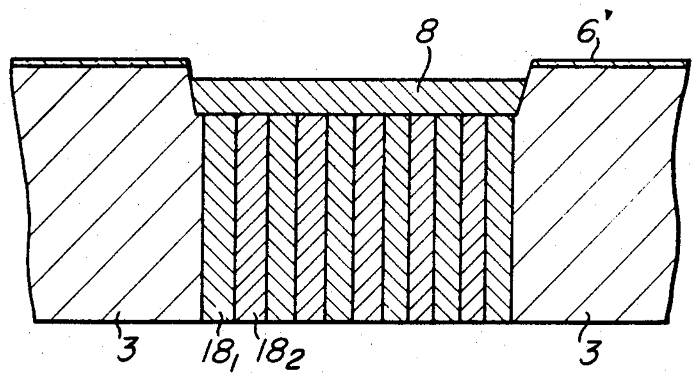
FIG. 5 is a cross section of a main part of a domain switching element, taken along the direction perpendicular to that of extension of transparent electrode on the element.

2. If the domain switching element according to the invention is so fabricated, as seen in FIG. 5, as not to have any domain wall on either side of the switching region (where electrodes are disposed), it is a domain switching element of type A which performs switching at a certain threshold value.

3. By utilizing the method of producing an irregular ferroelectric domain switching element according to the present invention, a small nucleus domain can easily be formed so that the size of the element can be reduced.

Some embodiments of the present invention will now be described with reference to the drawing.

EMBODIMENT 1

Figure 4A:
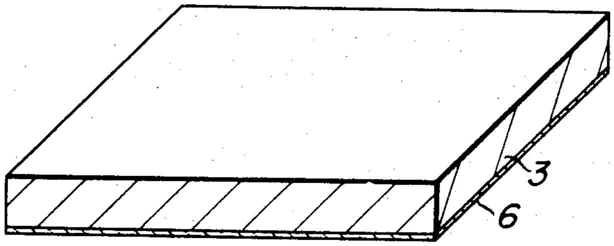
Figure 4B:
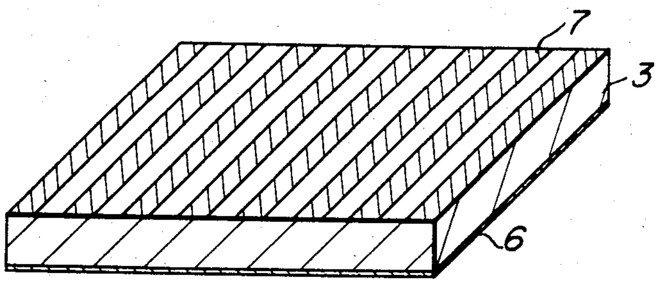
Figure 4C:
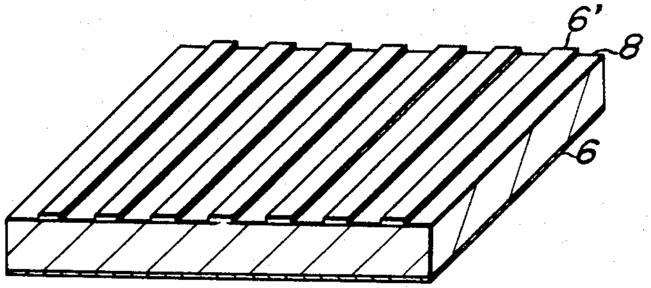

A *c*-cut plate about 0.6 mm thick is cut from a single crystal of GMO and is subjected to rough grinding at the opposite surfaces thereof until it has a thickness of the order of 400 $\mu$ . Optical finishing grinding is then carried out on this plate to obtain a quarter-wavelength plate 3 having a thickness of the order of 387$\mu$ and a planeness of the order of λ/10. A Nesa solution consisting essentially of $SnCl_4$ is sprayed at about 550° C for about 5 minutes on one of the ground surfaces of the quarter-wavelength plate 3 to provide a transparent electrode 6 on such surface as shown in FIG. 4a. About 1 gram of NaCl (or about 0.2 gram of LiF) is evaporated in a stripe pattern on the other surface of the quarter-wavelength plate 3 in a vacuum using a mask 7 having a plurality of stripes each 400μ wide arranged parallelly with a pitch of 1,000μ as shown in FIG. 4b. Then, the Nesa solution at about 550° C is used to provide a transparent electrode layer on the surface of the quarter-wavelength plate 3 having the NaCl or LiF stripes thereon. When the quarter-wavelength plate 3 is cleansed thoroughly with boiling water after slowly cooled down to room temperature, the transparent electrode portions on the surface portions covered with NaCl or LiF are removed to leave a stripe pattern consisting of alternate strips of transparent electrodes 6' about 0.6 mm wide and nucleus regions 8 about 0.4 mm wide as shown in FIG. 4c. It will be seen from FIG. 5 that each nucleus region 8 includes a plurality of domains $18_1$, $18_2$, ..... formed beneath a strain layer consisting principally of $NaGd(MoO_4)_2$ or $LiGd(MoO_4)_2$ produced by the reaction between NaCl or LiF and GMO. In the state in which the reaction layer is formed in the single-crystalline plate 3, lateral nuclei 21 may extend at right angles with the domains 18 running longitudinally in the form of stripes as shown in FIG. 6b. However, these undesirable nuclei 21 can be easily eliminated by applying pressure in the direction of the *b*-axis (<010>) so that a striped domain switching element as shown in FIG. 6a can be obtained.

A single domain can be obtained when the electrodes are deposited all the surfaces of the crystal and a strong force is applied in the direction of the *b*-axis while short-circuiting the electrodes. If the multi-domain pattern were produced due to the effect of, for example, an electrostatic field, reproduction of the multi-domain pattern would not be expected even after the force has been removed and the same would apply to the case in which an electric field is applied instead of the force. However, actually, the multi-domain pattern could be substantially reproduced even after the removal of the force or voltage applied to the crystal. In order to confirm directly the fact that the multi-domain pattern is produced by the strain occurring in the reaction layer, a pressure applying test was carried out while gradually removing the nucleus portion from the surface of the crystal by means of grinding. Any appreciable effect was not observed when the surface portion was removed over a depth of about 30 μ. However, when the surface portion was removed over a depth of about 36 μ and pressure was applied until a single domain could be obtained, the single domain structure remained and the multi-domain structure could not be obtained even when the stress was removed after the application of the pressure.

The reaction layer produced by the reaction between GMO and NaCl or LiF was examined by an X-ray diffraction method. The results proved the fact that $NaGd(MoO_4)_2$ or $LiGd(MoO_4)_2$ was present in the layer. Further, the results of measurement with an intereference microscope proved that the thickness of the transparent electrode portion was of the order of 800 A. and the surface was etched over a depth of about 1μ by the reaction between the crystal and NaCl or LiF.

Microphotographic observation of the section of the specimen for the purpose of measuring the depth of the reaction layer proved that the portion which was apparently considered the reaction layer extended over a depth of the order of 15 μ. This reaction layer portion was observed with a polarizing microscope while directing light to the surface thereof. The results proved that an alternating bright-dark stripe pattern appeared in the strip portion about 400μ wide at which the reaction layer was produced, and due to the strain produced in the reaction layer, this portion of the crystal had a striped multi-domain structure. From these results of observation, it can be concluded that the nucleus has a structure as shown in FIG. 7. Although the longitudinal nucleus may be intersected by the lateral nuclei 21 as shown in FIG. 6b in the state in which the reaction layer is produced in the crystal, such neclei 21 can be easily removed as shown in FIG. 6a by applying pressure in the direction of the *b*-axis.

A single domain structure can be obtained when the electrodes are deposited all the surfaces of the crystal and a strong force is applied in the direction of the *b*-axis while short-circuiting the electrodes. If the multi-domain pattern were produced due to the effect of, for example, an electrostatic field, reproduction of the multi-domain pattern would not be expected even after the force has been removed and the same would apply to the case in which an electric field is applied to the crystal instead of the force. However, actually, the multi-domain pattern could be substantially reproduced even after the removal of the force or voltage applied to the crystal. The rate of reproduction was better when LiF was used than when NaCl was used. In order to confirm directly the fact that the multi-domain pattern is produced due to the strain occurring in the reaction layer, a pressure applying test was carried out while gradually removing the nucleus portion, reacted by NaCl or LiF, from the surface of the crystal by means of grinding. Any appreciable effect was not observed when the surface portion was removed over a depth of about 30 μ. However, when the surface portion was removed over a depth of about 36μ and pressure was applied until a single domain was obtained, this single domain structure remained and the multi-domain structure could not be obtained even when the stress was removed after the application of the pressure. Thus, it was proved that the multi-domain structure could not be entirely reproduced in such a case. From the above fact, it is considered that the multi-domain structure is evidently produced by the strain occurring in the reaction layer. As for the crystal portion to which no NaCl or LiF is applied and which is sandwiched between the electrode portions, it takes a stable state when it is in the form of a single domain and these electrode portions are short-circuited to each other. If such crystal portion is in the form of a multi-domain structure, the energy is higher by an amount corresponding to the energy of the domain walls. Thus, the crystal portion sandwiched between the electrode portions shown in FIG. 6a, in which the longitudinal nuclei 18 are solely present in the element, can take a stable state when it is in the form of a single domain. However, in the structure shown in FIG. 6b, the energy becomes correspondingly higher due to the fact that the lateral nuclei 21 extend into the crystal portion sandwiched between the electrode portions. Therefore, when a material such as NaCl is evaporated in a stripe pattern on one of the surfaces of an irregular ferroelectric single crystal in the direction of <110>, and after depositing a transparent electrode forming material on that surface, the surface is cleansed with water to provide a plurality of striplike transparent electrode portions and a plurality of multi-domain portions interposed between the electrode portions, the probability with which the crystal portions underlaying the transparent electrode portions are divided into a plurality of domains due to the appearance of the lateral nuclei is lower than the probability with which the longitudinal nuclei are soley formed and such crystal portions take the form of a single domain, with the result that a structure as shown in FIG. 7 can be finally obtained. In FIG. 7, the reference numeral 3 designates a single-crystalline plate of GMO; 6 and 6', transparent electrodes; 18, a plurality of multi-domain regions or longitudinal nuclei; and 19, domain walls. Since the longitudinal nuclei 18 are only effective for switching operation and the lateral nuclei 21 are undesirable, the process above described is a very preferable means for producing a domain switching element.

In lieu of the arrangement above described which consists of a plurality of domain switching regions and multi-domain regions, an arrangement may be employed in which a pair of multi-domain regions are disposed on opposite sides of a domain switching region. In some special cases in which only one switching is required, an arrangement may be employed in which such a multidomain regions are disposed on opposite sides of a domain switching region.

EMBODIMENT 2

Nuclei are formed in a quarter-wavelength plate prepared from a *c*-cut single crystal of GMO in the manner described in the first embodiment. More precisely, an electrode in the form of a transparent film of conductive material such as $SnCl_4$ is deposited at about 500° C on one surface of the quarter-wavelength plate and the plate is cut along the direction <110> into a rectangular shape having a size of 8 mm × 6 mm. A pair of strips 1 mm wide of NaCl are evaporated on the other surface of the reactangular quarter-wavelength plate at the opposite end edge portions of the crystal surface along the sides having the length of 6 mm. An electrode layer in the form of a transparent film of conductive material such as $SnCl_4$ is deposited all over the latter surface of the plate and the plate is slowly cooled down to room temperature. Then, the plate is thoroughly cleansed with water to obtain an element which is provided with a pair of nuclei of multi-domain structure at the opposite sides of the plate. Then, when pressure is applied to this element in a diagonal direction thereof, the switching region is rendered in the form of a single domain since this direction is the direction of the a-axis of the crystal.

Then, when pressure is applied in the other diagonal direction or direction of the *b*-axis perpendicular to the above-mentioned diagonal direction, there occurs a reversal between the *b*-axis and the *a*-axis. Thus, the switching region is alternately switched when a force tending to establish a single domain of one polarity and a force tending to establish a single domain of the opposite polarity are imparted to the element in directions perpendicular to each other. A spring normally imparting a force in one of the perpendicular directions is used to continuously impart a constant biasing stress to the crystal, and a spring loaded piston is disposed to impart a force to the crystal in a direction perpendicular to the direction above described. When the force urging the piston overcomes the biasing stress, the crystal can be switched, but the crystal is switched back to the original state when the force urging the piston is reduced to a value smaller than the biasing stress. The increase in the biasing stress results in a larger counteracting force required for switching the crystal, and the reduction in the biasing stress results in a smaller counteracting force required for switching the crystal.

The element above described was superposed on another quarter-wavelength plate and these two plates were disposed in diagonal relation between a pair of polarizers whose directions of polarization are at right angles with each other. Means such as a He-Ne gas laser device was used to direct a laser beam of 6,328 A. to the device. A balance could be obtained by utilizing the fact that the light beam passing through the device can be switched on and off by the switching operation of the switching element. In this balance, a screw means and a scale were employed to quantitatively measure the biasing stress. The means for imparting the biasing stress to the crystal may be replaced by means including leads connected to the transparent electrodes on the opposite surfaces of the crystal for applying a d.c. bias voltage across the crystal. This latter arrangement is preferable over the means for imparting the biasing stress in that the voltage can be quantitatively controlled more accurately. However, continuous application of the dc voltage over an extended period of time results in accumulation of space charges on the surface of the crystal thereby tending to fluctuate the characteristics of the crystal. Thus, in the practical device, an arrangement was employed in which the bias voltage was applied only during the measurement of the external force imparted to the crystal and the electrodes on the crystal were normally shorted by a resistor having a high resistance of the order of 1 megohm. The magnitude of the dc bias voltage may be suitably selected so that the domain wall is at rest in the central portion of the crystal when no external force is imparted to the crystal. Naturally, the crystal is normally lightly pressed by the force of the spring associated with the pressure applying piston even when the external force is zero. A good result could be obtained when the force of the spring associated with the piston is of the order of 2 kilograms per square centimeter. The element can thus measure the external force imparted thereto. When the force imparting portion is completely isolated from the element so as not to impart any force to the element and positive and negative pulses are applied to the element through biasing terminals, an optical shutter suitable for the on-off of light can be obtained. The thickness of the quarter-wavelength plate of single-crystalline GMO irradiated with the laser beam emitted from the He-Ne laser device is 387$\mu$ as described previously. Therefore, the optical shutter can turn on and off the He-Ne laser beam in response to the electrical signal. It has been found that this optical shutter is advantageous over a conventional mechanical shutter in that it can accurately operate at high speeds and it does not develop undesirable vibrations.

The quarter-wavelength plate of single-crystalline GMO having a plurality of nuclei as above described can carry out a stable switching operation. Thus, when, for example, it is used as an optical shutter for white light such as one commonly used in a camera, the shutter can operate stably over a long period of time. A pair of c-cut GMO plates having respective thicknesses of about 210μ and 195μ are disposed in diagonal relation and combined with a plate of rock crystal having a thickness of about 135μ to form a sandwich and this sandwich is disposed between a pair of polarizers whose directions of polarization are at right angles with each other. The device is disposed in front of an image pickup element of a color television camera. A voltage at about 150 volts is applied across the transparent electrodes deposited on the opposite surfaces of the two plates of GMO while suitably varying the polarity thereof according to a program so that such voltage can be applied in the form of a predetermined pulse signal. The color modulator having the above structure can convert white light incident thereupon into red, green and blue colors successively depending on the electrical signals so programed. This color modulator can carry out a stable switching operation without any fear of such a situation that the nuclei may be destroyed during the switching operation due to appearance of a state in which such domains cross at right angles.

EMBODIMENT 3

A quarter-wavelength plate of single-crystalline GMO is prepared in the manner described in the first embodiment. A transparent electrode forming solution consisting essentially of $SnCl_4$ is sprayed at about 550° C for about 5 minutes on one of the surfaces of the quarter wavelength plate. A metal mask consisting of a plurality of stripes each 1 mm wide arranged parallelly with a pitch of 2 mm is superposed on the other surface of the quarter wavelength plate, and after laying a fine meshed silk gauze on the matal mask, a paste obtained by kneading powdery low-melting glass with polyvinyl alcohol is applied by a roller to that surface of the quarter-wavelenth plate according to a so-called screening method. The quarter-wavelength plate having a powdery low-melting glass coated in a 1-mm wide and 2-mm pitched stripe pattern on the surface thereof is placed in an electric furnace to be heated up to about 650° C for about 15 minutes. Thereafter, the quarter-wavelength plate is slowly cooled down to room temperature to obtain a structure having a plurality of spaced glass films on one surface of the crystal plate. A metal mask similar to that above described is superposed on the said surface of the crystal plate in such a manner that the stripes of the metal mask cover the glass film portions, and the crystal plate having the metal mask thereon is placed in a vacuum apparatus. In the vacuum apparatus, a high vacuum of the order of $10^{-6}$ mmHg is first established and then a vacuum of the order of $10^{-3}$ to $10^{-4}$ mmHg is established. Oxygen is admitted into the vacuum apparatus while maintaining the vacuum at $10^{-3}$ to $10^{-4}$ mmHg, and indium is evaporated while heating the crystal plate up to about 400° C. The evaporated indium turns into a transparent film of $InO_2$ about 800 A. thick and then the crystal plate is cooled down to the room temperature. A switching element similar to that described in the first embodiment can be obtained. In the switching element thus obtained, the strip electrodes and the nuclei of multi-domain structure underlying the strain layers produced by the glass are arranged alternately like the switching element described in the first embodiment.

The first and second embodiments above described have referred to the method of chemically producing the strain layer by causing NaCl or LiF to react with GMO. However, the material used for chemical reaction with GMO is in no way limited to NaCl or LiF and any other suitable materials such as fluorides of a metal such as Na may be equally effectively employed. Since the sodium fluorides react easily with GMO at a temperature employed in depositing the Nesa transparent electrode, any convenient material may be selected from them. Further, in this case, the metal of the metal halide may be K or Li or a rare earth element such as La, Ce or Nd so that it may replace a part of R' in an isomorphous GMO structure given by the general formula $(R_xR'_{1-x})_2O_3 \cdot 3Mo_{1-e}W_eO_3$, where R and R' are rare earth elements, $x$ lies in the range of 0 to 1.0 and $e$ lies in the range of 0 to 0.2.

Furthermore, in the third embodiment, a method has been employed in which glass is fused to the surface of the crystal for producing the strain layer instead of utilizing the layer produced by the chemical reaction. However, the nucleus can be effectively formed by another method in which a strain layer forming material having a coefficient of thermal expansion different from that of the crystal is bonded to the crystal by an adhesive at a temperature higher than the Curie temperature. The nucleus may also be formed by another method in which the portion to be formed with such domain may be irradiated with X rays or any other suitable radiation or may be bombarded by ions for forming the strain layer on the surface.

EMBODIMENT 4

A domain switching element of single-crystalline GMO having a plurality of nuclei of multi-domain structure each underlying a strain layer was prepared in the manner described in the first and third embodiments. Indium was evaporated on the end portions of transparent electrode strips on one surface of the switching element and on one end portion of a transparent electrode on the other surface of the switching element, and leads each having an indium clad end were connected to the evaporated indium terminal portions by applying heat under pressure. A stepped voltage generator capable of generating a highest voltage of about 400 volts was connected to ground through a resistor having a resistance of 1 kilohm. The leads extending from the transparent electrode strips of the domain switching element were successively connected to the high-voltage side of the voltage generator and the lead extending from the transparent electrode on the other surface was connected to the voltage generator through the resistor. Voltages of various levels were generated by the stepped voltage generator to measure the domain switching characteristics of the switching element. In this measurement, the switching current flowing through the series resistor of 1 kilohm was observed by a memory scope and the total switching time required for the switching current to drop to zero was measured on a cathode-ray tube. The results are shown in FIG. 8 which shows the relation between the applied voltage and the switching speed.

It is apparent from FIG. 8 that the switching element of single-crystalline GMO having the nuclei of multi-domain structure each underlying the strain layer can be easily switched in response to the application of a voltage higher than that of a coercive field $Ec \approx 1.7$ kilovolts per centimeter. It has been found that the characteristics of the switching element remain unchanged even with repeated switching. It has been also found that the characteristics of the switching element remain also unchanged and stable even with application of a reverse dc voltage over an extended period of time and with an increased humidity.

In lieu of the single crystal of GMO described hereinbefore, an isomorphous material given by the general formula $(R_xR'_{1-x})_2O_3 \cdot 3Mo_{1-e}W_eO_3$ may be used, where R and R' are rare earth elements, $x$ lies in the range of 0 to 1.0 and $e$ lies in the range of 0 to 0.2. Further, any other suitable irregular ferroelectrics except water-soluble ones such as Rochelle salt and potassium dihydrogen phosphate (KDP) may be equally effectively employed.

The switching element utilizing a *c*-cut plate of single-crystalline GMO or more generally a *c*-cut plate of an irregular ferroelectric material according to the present invention includes two types as shown in FIGS. 9*a* and 9*b* in addition to the type in which the domain wall exists at the boundary between the switching region and each of the adjoining nuclei or strain layers. In the type which is called herein the type A shown in FIG. 9*a*, the domain wall intrudes into the nuclei. In the type which is called herein the type B shown in FIG. 9*b*, the domain wall exists at the boundary between the switching region and at least one of the nuclei or strain layers. The threshold value $E_t$ of the type B element is equal to $E_c$ since, in the type B, the domain wall exists at the boundary between the switching region and one of the nuclei and this domain wall is easily movable toward the opposite side in response to the application of a voltage $E_a$ which is higher than $E_c$. However, due to the fact that this threshold value $E_t$ fluctuates within a range of ±24 percent or more depending on the manner of working on the crystal, the threshold value of the type B element cannot be exactly determined. On the other hand, in the type A element, the direction of spontaneous polarization in the switching region is the same as the polarity of spontaneous polarization in the nuclei on the opposite sides of the switching region, and no domain walls exist in the switching region including the boundaries. Thus, the threshold value $E_t$ of the type A element is $E_t = 3\ E_c$ (which amounts to about 300 volts) and takes a constant value without being substantially adversely affected by the manner of working on the crystal.

The fluctuation of ±24 percent in the threshold value $E_t$ of the domain switching elements is a limit required from practical design conditions. When a plurality of domain switching elements as above described are arranged in the form of, for example, a matrix array, the fluctuation in the threshold value $E_t$ of these elements is inevitably increased and it is difficult to operate such a matrix array with a voltage coincidence method. This is a fatal problem for a memory and an attempt to develop an optical space modulator as will be described later by the use of GMO must be given up unless the switching characteristics are re-investigated to find some useful means so that all the elements possess uniformly the same threshold value. Therefore, in order that a matrix array of a plurality of such domain switching elements can be driven by a voltage coincidence method, these domain switching elements must have an exactly determined threshold value. The type A element is solely suitable for such application. A method of making a domain switching element of the A from a *c*-cut plate of an irregular ferroelectric material will be described hereunder.

EMBODIMENT 5

A *c*-cut plate about 0.6 mm thick is cut from a single crystal of GMO and is subjected to rough grinding at the opposite surfaces thereof until it has a thickness of the order of 400 $\mu$. Optical finishing polishing is then carried out on this plate to obtain a quarter wavelength plate having a thickness of the order of 387$\mu$ and a planeness of the order of $\lambda/10$. A Nesa solution consisting essentially of $SnCl_4$ is sprayed at about 550° C for about 5 minutes on one of the ground surfaces of the quarter-wavelength plate to provide a transparent electrode thereon. About 1 gram of NaCl (or about 0.2 gram of LiF) is evaporated in a stripe pattern on the other surface of the quarter-wavelength plate in a vacuum using a mask having a plurality of stripes each 400 $\mu$ wide arranged parallelly with a pitch of 1,000 $\mu$. Then, a Nesa solution at about 550° C is used to provide a transparent electrode layer on the said surface of the quarter-wavelength plate having the NaCl or LiF stripes thereon. When the quarter-wavelength plate is cleansed thoroughly with boiling water after slowly cooled down to room temperature, the transparent electrode portions on the surface portions covered with NaCl or LiF are removed to leave a stripe pattern consisting of alternate strips of transparent electrodes about 0.6 mm wide and nuclei about 0.4 mm wide as shown in FIG. 4*c*.

The layer produced by the reaction between GMO and NaCl or LiF was examined by an X-ray diffraction method. The results proved the fact that $NaGd(MoO_4)_2$ or $LiGd(MoO_4)_2$ was formed in the layer. Further, the results of measurement with an interference microscope proved that the thickness of the transparent electrode portions was of the order of 800 A. and the surface was etched over a depth of about 1 $\mu$ by the reaction between NaCl or LiF and the GMO crystal. Microphotographic observation of the section of the specimen for the purpose of measuring the depth of the reaction layer proved that the portion which was apparently considered the reaction layer extended over a depth of the order of 15 $\mu$. Although the longitudinal nucleus may be intersected by lateral nuclei (running at right angles with the direction of the longitudinal nucleus) in the state in which the reaction layer is produced in the crystal, such lateral nuclei can be easily removed by applying pressure in the direction of the *b*-axis.

The elements obtained by the above process are formed with the longitudinal nuclei therein but they are commonly an aggregate of the type A elements and type B elements. However, the type A elements could be exclusively obtained when the *c*-cut plates of single-crystalline GMO were heated up to 180° C and were then cooled down to room temperature in an electric field while applying a voltage of 65 volts and imparting a stress of 40 grams in the direction of the *a*-axis or *b*-axis of the rhombic structure. Further, the type A elements could be exclusively obtained when the crystals were heated up to 120° C while applying a dc voltage of 500 volts thereto to produce single-domain elements and then the elements were cooled down to room temperature while applying a constant and lower voltage of 200 volts thereto.

EMBODIMENT 6

A type A element was produced by the process described in the fifth embodiment. A stepped voltage generator capable of generating any voltage between 0 to 400 volts was connected to ground through a resistor having a resistance of 1 kilohm. The type A element was connected to the stepped voltage generator and voltages of various levels were generated by the stepped voltage generator to measure the domain switching characteristics of the type A element. In the measurement, the switching current flowing through the series resistor of 1 kilohm was observed by a memory scope and the total switching time required for the switching current to drop to zero was measured on a cathode-ray tube. The results are shown in FIGS. 10*a*, 10*b* and 11. It will be seen from FIG. 11 showing the relation between the applied voltage and the switching time *ts* that the switching current flows in a short period of time after the application of a voltage slightly lower than the threshold voltage. The curve A represents the switching characteristics of the type A element, and the curve B represents similar characteristics of a comparative type B element. It will be seen that there is an appreciable difference between the switching characteristics of these elements. The total switching time is determined by the waiting time since the period of time required for the domain wall to move within the domain switching region is not so long.

EMBODIMENT 7

A *c*-cut plate of single-crystalline GMO having a size of 12 mm × 3 mm is prepared. NaCl is evaporated on one of the *c*-cut surfaces of the plate in a stripe pattern consisting of a plurality of stripes each 0.5 mm wide arranged parallely with a pitch of 1 mm. Then, a Nesa solution consisting essentially of $SnCl_4$ is applied to that surface so as to deposit a plurality of transparent strip electrodes 126 which are each 0.5 mm wide with a spacing therebetween of 0.5 mm and are disposed in the direction of <110>. A lead 125 is connected to each of these transparent strip electrodes 126. Further, a transparent electrode 127 is deposited all over the other *c*-cut surface of the plate and a lead 128 is connected to this transparent electrode 127.

Referring to FIG. 13 showing a pattern display system according to the present invention, a polarizing unit A includes a polraizer 131, a switching element 135 of the kind above described having a plurality of lateral transparent electrode strips 126 whose geometrical arrangement registers with the arrangement of slits on a slit plate 134, and a quarter-wavelength plate 133 of bi-axial crystal disposed in diagonal fashion with respect to the switching element 135. Another polarizing unit B includes an analyzer 136, a quarter-wavelength plate 135', a slit plate 138, a switching element 139 of the kind above described having a plurality of longitudinal transparent electrode strips, and an analyzer 140, and the electrodes strips in the unit B are disposed perpendicularly with respect to those in the unit A. The switching element 135 is provided with ten laterally or horizontally extending transparent electrode strips. When a negative voltage is applied to all these electrode strips by way of 10 leads 141 for orienting the direction of polarization in the negative direction, the retardation by the switching element 135 is given by $R = -\frac{1}{4}\lambda_0$ and this retardation cancels the retardation by the quarter-wavelength plate 133 so that the light beam is intercepted. On the other hand, when a positive voltage is applied to anyone of the lateral electrode strips of the switching element 135 for orienting the direction of polarization beneath the specific electrode strip in the positive direction, the retardation by the switching element 135 is now given by $R = +\frac{1}{4}\lambda_0$ and this retardation is added to the retardation by the quarter-wavelength plate 133 to give the resultant retardation of $\frac{1}{2}\lambda_0$. Thus, the combination acts as a half-wavelength plate, and the light beam emanating in strip form from the specific electrode or row on the switching element 135 solely passes through the analyzer 135 to enter the unit B. The switching element 139 is provided with 10 longitudinally or vertically extending transparent electrode strips, and these electrode strips are arranged in perpendicular relation to those on the switching element 135. Thus, the corresponding portions of the ten electrode strips on the switching element 139 in the unit B are illuminated with the light beam emerging in the strip form from the unit A. This light beam may be entirely intercepted or a desired portion of the light beam may be allowed to pass through the unit B as in the unit A. It is thus possible to simultanteously produce 10-bit information corresponding to one row of a pattern required for a laser hologram. Since the switching regions beneath the electrode strips on the switching elements in the units A and B can be switched independently of one another, independent driving at the same time can easily produce a pattern corresponding to one row at a time. An operating voltage of 150 volts having the same amplitude in the positive and negative directions was selected in this system. The switching time was about 1 msec and the voltage pulse width was 2 ms.

The pattern can be maintained even after the disappearance of the pulse voltage and is recorded as a spot having a diameter of 1 mm at a point on a sensitive plate 143 through a lens 142. After exposure for 100 ms, the unit A is switched and the light beam in strip form is shifted to the next row. At the same time, the columns in the unit B are switched so as to produce the pattern of the next row. When the above manner of operation is repeated 10 times, $N^o$ information are concentrated on the same point of the sensitive plate to be recorded by the multiple sensing. In other words, $n \times m = N^o$ patterns can be concentrated on one point of the hologram by $m$ switching operations, where $m = n$.

Patterns were recorded at 10 rows × 10 columns = 100 points on the sensitive plate 143 of 2 cm × 2 cm and thus information of $10^4$ bits could be recorded. It has been found that the system can satisfactorily operate as an optical pace modulator of the multiple exposure type even with an information density considerably higher than that above described.

EMBODIMENT 8

The seventh embodiment above described provides a multiple exposure system and the S/N ratio is reduced with the increase in the number of times of exposure. The present embodiment provides a system which comprises writing information of one page, that is, for example, information of 144 digits × 128 words in an optical space modulator by scanning an electrical signal and directing a laser beam only once to the modulator so as to reproduce the information of one page on a sensitive plate or sheet according to halography.

A type A element having an exactly determined threshold value and including a plurality of nuclei having strain layers is produced by a process similar to that described in the seventh embodiment. This crystal plate is cut into a plurality of or eight elongated crystal bars perpendicularly with respect to the nuclei 143 as shown in FIG. 14 so that they have a width of 0.3 mm and are arranged parallelly with a pitch of 1 mm like the teeth of a comb. A digit side terminal plate 144 having a plurality of or nine leads $145_1$, $145_2$, ..... $145_9$ previously embedded therein is fixed in parallel with the rightmost crystal bar as shown in FIG. 14. Each of the crystal bars is formed with a plurality of or 10 nuclei 143 arranged at regular internals, and thus, there are nine switching regions between these nuclei 143. Gold is evaporated on these switching regions to provide leads to be connected to the leads $145_1$, $145_2$, ..... $145_9$ respectively. More precisely, a molten resin is filled in the space between the crystal bars to provide a base for evaporation, and a plurality of gold ribbons 148 about $1\mu$ thick are evaporated on the switching regions in parallel with the laterally aligned nuclei 143 as shown in FIG. 14. Before evaporating gold, a base layer of chromium about 200 to 500 A. thick may be evaporated in order to ensure firm bond between the crystal and gold. The gold ribbons 148 are then plated with a conductive metal to have an increased thickness of 3 to $5\mu$, and then the photoresist technique is used to bore a light admission opening having a diameter of about $500\mu$ overlying each of the switching regions. Indium is evaporated on the rear surface at one end of each of the crystal bars, and a word side terminal plate 141 having indium deposited at the corresponding portions 140 is fixed to the crystal bars. This terminal plate 141 is provided with eight leads 161 to 168. In this manner, an optical space modulator consisting of $8 \times 9 = 72$ elements can be obtained. This optical space modulator may be operated by a voltage coincidence method. To this end, it is necessary to dispose these elements in matrix form and to provide $2 \times (8 \times 9) = 144$ leads and 72 driving circuits for driving these elements independently of one another. The number of the leads and driving circuits can be reduced by disposing the elements in matrix form and applying signal voltages of $\pm v/2$ volts in the directions of the rows and columns independently of one another. Thus, a voltage of $v$ volts is applied to the element at the intersection between the row applied with $+v/2$ volts and the column applied with $-v/2$ volts. Information is selectively written in a specific element at the intersection when the threshold voltage $v_t$ is given by the relation $v>v_t>v/2$.

This optical space modulator was connected to a ±120 volts test driver having nine digit side circuits, eight word side circuits and 2 msec gates to be driven by the driver. The results proved that any desired patterns including a single checker board (with alternate "1" and "0") and a double checker board (with "1" or "0" appearing after every two "0's" or "1's") could be obtained, and the modulator could operate satisfactorily without any trouble even after a test over 10 continuous days.

This optical space modulator differs from that described in the seventh embodiment in that the light admission opening a serving as optical shutter means are aligned on one plane. Thus, undesirable derangement of the image by the diffraction can be reduced and a hologram having an improved contrast can be obtained. The means contrast ratio of images written by parallel light beams and reproduced by parallel light beams was about 150.

While this embodiment has been described with reference to an optical space modulator having a capacity of 8 × 9 bits. An extension of the capacity to 128 × 144 bits has been attempted, and there is a fair prospect of realization of such a capacity.

In the domain switching element of irregular ferroelectric material described in the first to fifth embodiments of the present invention, a method has been proposed for forming a nucleus of multi-domain configuration adjoining a switching region by producing a strain layer including a compound of a metal halide and GMO due to the difference between the lattice constants of the compound and GMO. However, the domain switching element thus obtained is still insufficient in the quantitative control and information reproducibility since the method employs thermal diffusion of the evaporated material. Further, due to the fact that the switching voltage depends on the switching characteristics of the switching element, the switching voltage is difficult to be set at an exactly determined threshold value. A more reliable method of producing a nucleus of multi-domain configuration will be described hereunder.

EMBODIMENT 9

Referring to FIG. 15 which schematically shows a sectional view of another embodiment of this invention, a half-wavelength ($775\mu$) plate 151 of GMO is made by cutting a crystal of GMO along a plane perpendicular to the crystallographical axis thereof and then polishing the cut surfaces. On both surfaces of the plate 151, stripes of transparent planar electrodes 154 which are 0.6 mm wide are deposited at center distance of 1 mm, the stripes on both surfaces crossing each other. A lead mask 152 of the same stripe pattern is placed on the electrode layer 154, exposing the areas of the GMO plate in which nuclei are to be produced. The thus masked plate is irradiated with protons of $8 \times 10^5$ *e*V at a density of $1 \times 10^{16}/cm^2$ for 15 minutes to produce nuclei 155 containing a quantity of defects. An actual test performed on 10 bits of such elements revealed the fact that the threshold value for switching action was within a range of 220 V ± 20 V. This fact shows the good uniformity of the elements as compared with 220 V ± 40 V for the conventional elements.

EMBODIMENT 10

A test was performed on an element which was made by the above-mentioned conventional method and contained nuclei having very little strain. Nuclei containing areas of the element was irradiated with gamma rays 153 of 0.8 Mrad using the above-described mask. The result showed that the threshold value for switching action varied within a range of ± 25 V at center value of 230 V. Such a good result has not been obtained with the known method.

EMBODIMENT 11

Referring to FIG. 16 which schematically shows a further embodiment of this invention, a *c*-cut plate 161 of a single crystal of $Tb_2(MoO_4)_3$ which is a homologue of GMO, is optically polished to a thickness $387\mu$ which corresponds to a quarter-wavelength of He-Ne laser light. The polished plate is cleaved into a rectangular plate of 10 mm × 20 mm in such a manner that the edges of the plate are in the direction of <110>. On each major surface of this cleaved plate 161, a layer of $SiO_2$ having a thickness of about $3\mu$ is deposited by sputtering to form a glass-like coating 164. A mask 162 is placed on the coating 164, and regions 165 of the plate under exposed portions 166 of the coatings are irradiated with He ions 163 of 500 keV at a flux density of $1 \times 10^{16}/cm^2$ for 30 minutes by means of an ion-implantation machine. Then the coating is removed and electrodes are attached to complete a domain switching element. An actual test brought about satisfactory result unobtainable by the conventional method, the variation of the threshold voltage for switching action ranging within ± 15 V around the center value of 100 V.

The above-mentioned glass-like coating contributes to effective production of the strains due to the ion implantation. If a GMO crystal containing heavy Mo atoms is directly bombarded with light corpuscles such as argon ions, majority of the bombarding ions are reflected at the surface of the crystal and effective ion implantation is not achieved. The glass-like coating containing light Si atoms helps the light ions to be effectively injected into the coating and further into the crystal to thereby produce strains in the coating and the crystal.

In the above embodiments 9 and 11, the production of the strained layer in a GMO crystal by the irradiation is attributed to volumic variation due to a change in the order of the long-distance atomic configuration.

EMBODIMENT 13

In the fabrication of a domain switching element, if the strain layer is produced only on one side of the *c*-cut plate of the irregular ferroelectric crystal (a "*c*-cut plate" means a plate cut in the direction perpendicular to the ferroelectric axis of the crystal), the plate tends to warp because of internal strain. In order to avoid this, the strained layer must be produced on each side of the plate. This embodiment relates to the fabrication of such a domain switching element.

A single crystal of GMO is cut along planes perpendicular to *c*-axis, that is, the axis on which the direction of polarization coincides with the orientation of the crystal in which the change of the sense of birefrangence due to the polarization reversal occurs. The cut crystal is polished to a half-wavelength ($775\mu$) plate. Covering the whole area of one surface of the plate, a transparent Nesa electrode is deposited at a temperature of 500° to 550° C, followed by gradual cooling to the room temperature. On the other surface of the plate, a mask of stripe pattern ($400\mu$ wide at center distance of $1,000\mu$) is placed, and a coating of litium fluoride (LiF) is vapor-deposited in thickness of 2,000 angstrom over the whole surface so that a layer of LiF is formed on the plate in the pattern of the stripe. The plate with the LiF layer is again heated and a layer of Nesa electrode is deposited at 490° C over the whole surface also covering the LiF layer, followed by gradual cooling to the room temperature and subsequent rinsing with hot water of about 60° C. Thus, a domain switching element containing nuclei is obtained as schematically shown in FIG. 17. A test result on the switching characteristics of such an element showed that back-switching was observed in 8 bits out of 10 bits. Further, microscopic observation of the profile of the element revealed a distinct warp 173 as shown in dash lines in FIG. 17.

However, if a similar layer of LiF is deposited also on the opposite surface which is initially coated with a Nesa electrode, a switching element having the structure as schematically shown in FIG. 18 is obtained. An actual test on the switching characteristics verified very reliable nature of such elements, none of tested 10 bits causing back-switching. Moreover, no warp was not seen in microscopic observation.

EMBODIMENT 14

Using a crystal of terbium molybdate ($Tb_2(MoO_4)_3$) in lieu of GMO crystal in the above embodiment 13, a half-wavelength plate is made by similar process. By vapor-depositing a layer of LiF in the thickness of 2,000 angstron on each surface of the plate and by further depositing a transparent Nesa coating, a switching element is obtained. In a test, no back-switching was seen with such elements. Thus, very reliable characteristics of such elements were verified.

In the above embodiments, alkali halides such as NaCl, KCl and LiF deposited on a GMO plate react on the GMO and produce a compound having a crystallographical structure similar to scheelite. The compound is expressed by the following general formula.

$$(Li_{1-x-y}Na_xK_y)\ (R_{1-z}R'_z)\cdot(Mo_{1-e}W_eO_4)_2$$

where R, R′ represent at least one kind of rare earth element; $e$ is 0 to 0.22; $x$ is 0 to 1.0; $y$ is 0 to 0.8; $x + y \leq 1$; and $z$ is 0 to 1.0.

This invention is described in detail hereunder taking example by a single crystal of GMO. On one surface of (0 0 1) plate of GMO single crystal is deposited a transparent electrode such as a Nesa electrode, while on the opposite surface a layer of alkali halide such as NaCl, KCl or LiF is deposited. On the latter layer is further deposited a Nesa coating while the plate is heated. After that, the coated plate is rinsed with water to remove that part of alkali halide which has not participated in the reaction and also Nesa coating on such unchanged alkali halide. In the remaining area, there is produced a compound generally indicated by the above-mentioned formula as the result of the reaction of the alkali halide on GMO. Namely, if the alkali halide is NaCl, the produced compound is $NaGd(MoO_4)_2$. Similarly, with LiF or KCl, compound $LiGd(MoO_4)_2$ or $KGd(MoO_4)_2$ is produced respectively. $LiGd(MoO_4)_2$ and $NaGd(MoO_4)_2$ belong to tetragonal system and have the same structure s scheelite. It was found, however, that $KGd(MoO_4)_2$ had a different structure. $LiGd(MoO_4)_2$ or $NaGd(MoO_4)_2$ produced on $Gd_2(MoO_4)_3$ has strain due to the difference in lattice constant and coefficient of thermal expansion. To reduce such strain, multi-domains are produced in that portion of GMO which lies under the remaining $LiGd(MoO_4)_2$ or $NaGd(MoO_4)_2$. Using such multi-domains as the nuclei, polarization reversal is achieved by the application of an electric field. As to $KGd(MoO_4)_2$, however, production of multi-domains does not occur, nor production of a layer which contains strains.

As the result of a synthesizing experiment performed on the system of $LiGd(MoO_4)_2$, $NaGd(MoO_4)_2$ and $KGd(MoO_4)_2$, it was found that $LiGd(MoO_4)_2$ and $NaGd(MoO_4)_2$ form a perfect solid solution and that they have the same structure as that of scheelite. On the other hand, as to the system of $LiGd(MoO_4)_2$ and $KGd(MoO_4)_2$, a compound containing more Li than $(Li_{0.8}K_{0.2})Gd(MoO_4)_2$ can assume the scheelite structure, while a compound containing more K than $(Li_{0.8}K_{0.2})Gd(MoO_4)_2$ does not assume the scheelite structure but assumes the same configuration as $KGd(MoO_4)_2$. As to the system of $NaGd(MoO_4)_2$ and $KGd(MoO_4)_2$, a compound containing more Na than $(Na_{0.25}K_{0.75})Gd(MoO_4)_2$ assumes the scheelite structure while a compound containing more K than the same assumes the structure of $KGd(MoO_4)_2$ type. Therefore, as to the system of $LiGd(MoO_4)_2$, $NaGd(MoO_4)_2$ and $KGd(MoO_4)_2$, compositions which allow the compound to assume the scheelite structure must be within an area determined by lines connecting $NaGd(MoO_4)_2$, $LiGd(MoO_4)_2$, $(Na_{0.8}K_{0.2})Gd(MoO_4)_2$, $(Li_{0.2}K_{0.8})Gd(MoO_4)_2$ in the composition chart. The area outside of the above area is for compositions which define compounds of $KGd(MoO_4)_2$ type.

Hereunder are described several examples of the method for producing nuclei which are most important in the switching element of this invention.

EXAMPLE 1

An optically polished (001) plate of GMO is placed in an electric oven and sprayed with $SnCl_4$ at 500° to 600° C. The thus formed Nesa coating may have desired thickness, resistivity and transparency by properly choosing the temperature and pressure of the spray and the spraying time. Upon completion of the spray, the power to the oven is turned off and the plate is left to cool down to room temperature. FIG. 19 schematically shows a (001) plate 191 of GMO with a Nesa coating 192 on one surface thereof. Then, on the opposite surface, a mask is placed in parallel to the <110> direction of the crystal, and the plate with the mask is placed in a vacuum evaporator, in which is also placed a proper amount of NaCl, the latter being put in a boat-type heater made of molybdenum, tungsten or a like metal and supported across a pair of electrodes. The amount of NaCl influences thickness of strain layers to be formed. A test with various amount of NaCl ranging 0.05 g to 5 g proved that strain layers can be formed with NaCl of any amount in such a range. To return to the fabrication process, the evaporator is evacuated to $10^{-5}$ to $10^{-6}$ Torr, and the boat-type heater is energized to fuse NaCl. Then, the shutter provided between the boat and the crystal plate is opened to allow evaporated NaCl to deposite on the masked surface of the GMO plate. After that, the GMO plate is taken out from the evaporator, and the mask is removed. FIG. 20 schematically shows the plate 191 of GMO having a layer 193 of NaCl deposited on a selected area of the (001) surface thereof. The plate is again placed in an electric oven to be heated to a temperature of 500° to 600° C, and a Nesa coating is formed over that surface of the plate which is provided with the NaCl layer. FIG. 21 is a schematic sectional view of such a plate covered with the second Nesa coating 198. In the above heating process. NaCl of the layer 193 reacts on GMO of the plate 191 to thereby produce layers 194, 195 and 196. Layer 194 largely consists of NaCl, with a small amount of polycrystal of $NaGd(MoO_4)_2$ mixed therewith. Layers 195 and 196 are strain layers, layer 195 consisting of polycrstal of $NaGd(MoO_4)_2$, while layer 196 contains $NaGd(MoO_4)_2$ so oriented that the (001) plane thereof is substantially parallel with the corresponding plane of the GMO crystal plate 191. Layer 197 consists of GMO almost turned to non-crystal as the result of the heating. By rinsing with water, the Nesa coating 198 deposited on the NaCl layer 193 is washed away, as layers 193 and 194 dissolve into water. Therefore, the area on which the NaCl layer was deposited becomes thinner than the surrounding area by 1,000 to 3,000 A. as shown in FIG. 22. The chemical equation for the above reaction is as follows:

$$NaCl + Gd_2(MoO_4)_3 = NaGd(MoO_4)_2 + GdOCl$$
$$2GdOCl + H_2O = Gd_2O_3 + 2HCl \quad (1)$$

$NaGd(MoO_4)_2$ assumes a scheelite structure of tetragonal system having lattice constants of $a_o = 5.237 \pm 0.006$ angstrom and $c_o = 11.452 \pm 0.008$ angstrom. On the other hand, GMO has lattice constants of $a_o = 10.384$ angstrom and $b_o = 10.421$ angstrom. The difference between $a_o$ value of GMO and two folds of $a_o$ of $NaGd(MoO_4)_2$ makes a strain between layers, and multi-domains are produced within the GMO crystal under the thus strain layer. The structure of substances contained in layers 194, 195 and 196, the compositions of which are indicated in the above equation (1), is determined from analysis of X-ray diffractions. Namely, a mixture of GMO and NaCl is heated at 700° to 900° C in a platinum melting pot for 5 to 24 hours. The resultant white powder is rinsed with water to dissolving away remaining NaCl. The substance left in the pot is tested by the known method of X-ray diffraction, and it will be proved that the substance is $NaGd(MoO_4)_2$. Further, it is verified that $NaGd(MoO_4)_2$ is produced from a mixture of $Gd_2O_3$, $NaCO_3$ and $MoO_3$ respectively weighed out in the ratio of the chemical equivalence determined by the following equation (2), the mixture being heated at 500° to 700° C for 2 hours.

$$Na_2CO_3 + Gd_2O_3 + 4MoO_3 = 2NaGd(MoO_4)_2 + CO_2 \quad (2)$$

EXAMPLE 2

Using LiF in lieu of NaCl in the method of the above Example 1, a similar strain layer and therefore a multi-domain can be produced. As shown in FIG. 19, a Nesa coating is applied on one surface of a (001) plate of GMO crystal covering the hole area of the surface. On the opposite surface of the plate, a mask of tungsten, molybdenum or stainless steel is placed in parallel to the <110> direction of the crystal, and a layer of LiF is vapor-deposited in a vacuum evaporator. The plate with the coatings is heated in an electric oven at 500° to 600° C for 5 to 10 minutes. The depth of the strain layer to be formed can be controlled by the temperature and duration of this heat treatment. During this treatment, the second Nesa coating is applied. After that, the plate is taken out of the oven and rinsed with water. As the result, the layer of LiF and the next layer mostly consisting of LiF corresponding layers 193 and 194 in the preceding Example are rinsed away along with the Nesa coating lying thereon. Thus, a layer of polycrystal of $LiGd(MoO_4)_2$, another layer containing $LiGd(MoO_4)_2$ oriented parallel to the (001) plane and a further layer consisting of almost non-crystalline GMO respectively corresponding to layers 195, 196 and 197 in the preceding Example, are left in the GMO plate. Tests as regards the reaction of LiF on GMO were performed in methods similar to those in the preceding Example and production of $LiGd(MoO_4)_2$ was confirmed. The reactions are indicated by the following equations.

$$LiF + Gd_2(MoO_4)_3 = LiGd(MoO_4)_3 + GdOCl + MoO_3$$
$$2GdOCl + H_2O = Gd_2O_3 + 2HCl$$
$$Li_2CO_3 + Gd_2O_3 + 4MoO_3 = 2LiGd(MoO_4)_2 + CO_2$$

Lattice constants of $LiGd(MoO_4)_2$ are as follows: $a_o$ $= 5.186 \pm 0.003$ angstrom $c_o = 11.299 \pm 0.008$ angstrom.

EXAMPLE 3

Using KCl in lieu of NaCl in the method of the above Example 1, an experiment was performed to form strain layers in the plate of GMO. However, it was found that multi-domains were formed non only beneath the deposited KCl layer but in the whole body of the GMO plate. Thus, the function of the strain layer required for the switching element was not obtained. A synthesizing test was performed using $K_2CO_3$, $Gd_2O_3$ and $MoO_3$, and a chemical reaction as indicated in the following equation was confirmed.

$$K_2CO_3 + Gd_2O_3 + 4MoO_3 = 2KGd(MoO_4)_2 + CO_2$$

However, study by the X-ray diffraction revealed the fact that the product does not have a scheelite structure. Thus, it is clear that the useful function of strain layers cannot be expected from this product.

EXAMPLE 4

Using a plate of $Tb_2(MoO_4)_3$ crystal instead of the GMO plate in the foregoing Example 2, similar strain layers are formed in the plate as the result of the production of $LiTb(MoO_4)_2$.

EXAMPLE 5

Using a plate of $(Gd_{0.5}Dy_{0.5})_2$ crystal instead of the GMO plate in the foregoing Example 1, similar strain layers are formed in the plate as result of the production of $Na(Gd_{0.5}Dy_{0.5})(MoO_4)_2$.

EXAMPLE 6

Using a plate of $(Gd_{0.6}Sm_{0.2}Dy_{0.2})$ $(MoO_4)_3$ crsytal instead of the GMO plate and $NaCO_3$ instead of NaCl in the Example 1, similar strain layers are formed as the result of the production of $Na(Gd_{0.6}Sm_{0.2}Dy_{0.2})(MoO_4)_3$.

EXAMPLE 7

Using a plate of $(Tb_{0.95}Nd_{0.05})_2(Mo_{0.8}W_{0.2}O_4)_3$ crystal instead of the GMO plate in Example 1, similar strain layers are formed in the plate as the result of the production of $Na(Tb_{0.95}Nd_{0.05})(Mo_{0.8}W_{0.2})O_2$.

What we claim is:

1. A domain witching element comprising an irregular ferroelectric crystal plate consisting of a switching region, a first nucleus domain extending along the direction <110> of said irregular ferroelectric crystal which domain is a strain layer having a multiple-domain structure and disposed on one end surface of said plate, and a second nucleus domain extending along the direction <110> of said crystal which domain is strain layer having a multiple-domain structure and disposed on the other end surface of said plate, said first and second nucleus domains being isolated from each other, a pair of electrodes disposed on the two opposite planes of said crystal plate perpendicular to the ferro-electric axis of said crystal, and a power source for applying a voltage to said switching region through said pair of electrodes.

2. A domain switching element according to claim 1, wherein the portions of said first and second nucleus domains in the vicinity of said switching region have the same polarization directions as those in the corresponding portions of said switching region close to said nucleus domains.

3. A domain switching element according to claim 1, wherein said crystal plate is made of such a compound having a crystal structure similar to that of gabolinium molybdate as expressed by a formula $$(R_xR'_{1-x})_2O_3 \cdot 3Mo_{1-e}W_eO_3,$$

where R and R' are individual rare earth elements, $x$ various in the range from 0 to 1.0, and $e$ in the range from 0 to 0.2.

4. A domain switching element according to claim 2, wherein said crystal plate is made of such a compound having a crystal structure similar to that of gadolinium molybdate as expressed by a formula $$(R_xR'_{1-x})_2O_3 \cdot 3Mo_{1-e}W_eO_3,$$

where R and R' are individual rare earth elements, $x$ varies in the range from 0 to 0.1, and $e$ in the range from 0 to 0.2.

* * * * *